(No Model.)
J. T. O'BRIEN.
ATTACHMENT FOR SCAFFOLDS.
No. 437,934. Patented Oct. 7, 1890.
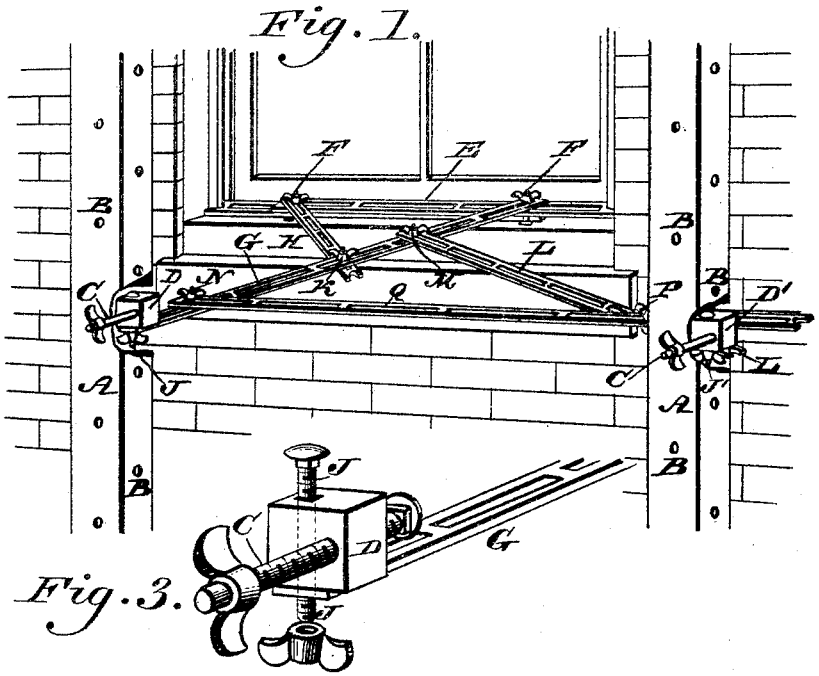
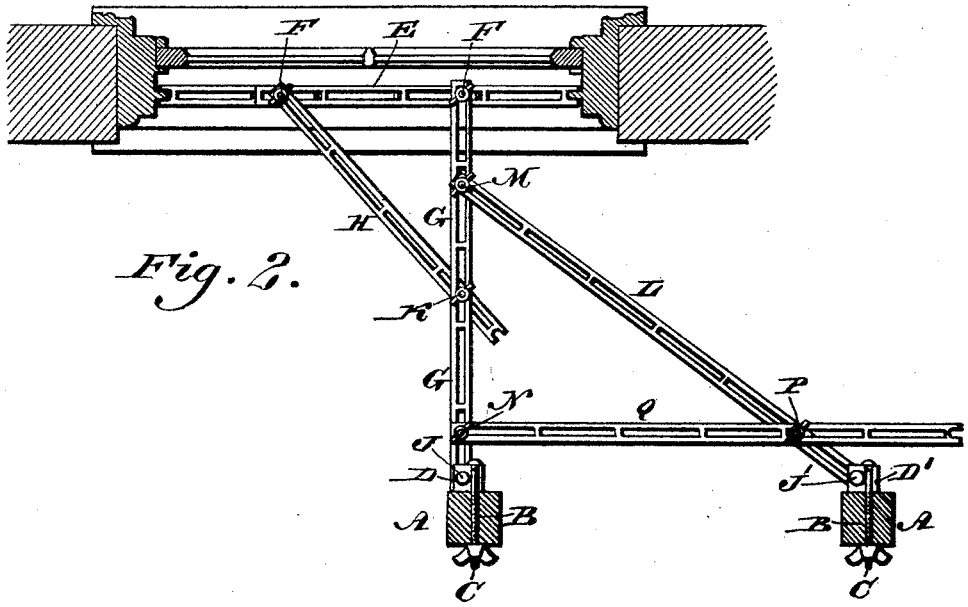
Witnesses:
P. F. Chagle
L. Douville
Inventor:
John T. O'Brien
by John A. Wiederheim
Attorney

UNITED STATES PATENT OFFICE.

JOHN T. O'BRIEN, OF PHILADELPHIA, PENNSYLVANIA.

ATTACHMENT FOR SCAFFOLDS.

SPECIFICATION forming part of Letters Patent No. 437,934, dated October 7, 1890.

Application filed January 24, 1890. Serial No. 337,984. (No model.)

*To all whom it may concern:*

Be it known that I, JOHN T. O'BRIEN, a citizen of the United States, residing in the city and county of Philadelphia, State of Pennsylvania, have invented a new and useful Improvement in Attachments for Scaffolds, which improvement is fully set forth in the following specification and accompanying drawings.

My invention consists of an attachment for a scaffold, whereby the uprights of the latter may be firmly braced, strengthened, and stiffened.

Figure 1 represents a perspective view of an attachment for a scaffold embodying my invention. Fig. 2 represents a top or plan view thereof, portions being in horizontal section. Fig. 3 represents a perspective view of a detached portion on an enlarged scale.

Similar letters of reference indicate corresponding parts in the three figures.

Referring to the drawings, A designates the standards or uprights of a scaffold, which are provided with openings B to receive the screw-bolts C, which connect the blocks D D' with said standards.

E designates an extensible bar formed of two bars, which are fitted to the window-sill and have their ends engaged with the sash-heads, said bars being adjustably connected by screws or bolts F, so as to be adapted to sills of different widths and be securely held in position.

To the bars E are connected the inner ends of the outwardly-projecting bar G and brace H, said brace H having its outer end connected with the bar G. The outer end of the bar G is connected by a bolt J with the block D, it being noticed that the screws or bolts F connect the bar E with the bar G and brace H and the bolt K connects the brace H with said bar G.

L designates a bar whose inner end is connected by means of a bolt M with the bar G between the brace H and bar E. The outer end of said bar L is connected with the block D' by means of a bolt or screw J'.

To the outer ends of the bar G and bar L there is secured by means of bolts N P the brace Q, it being noticed that the several bars and braces are slotted in the direction of their length to receive the respective screws or bolts, whereby they may be readily adjusted in angular, longitudinal, and lateral directions.

The operation is as follows: The standards are placed in position and connected, the several bars and braces being pivotally set in relation thereto. The nuts of the bolts or screws are then tightened, whereby the standards are doubly braced by the system of bars and braces and reliably sustained, the bars being tightly and firmly connected with said standards.

It is evident that the standards may be shifted to the right or left, or both right and left, of the window, as the case may be, examples of which are shown in the drawings, the bars and braces G H L Q being properly adjusted and tightened, the standards then being retained in their adjusted position, as previously stated. It is also evident that the attachment may be readily set up and taken apart.

Having thus described my invention, what I claim as new, and desire to secure by Letters Patent, is—

1. An attachment for a scaffold, consisting of bars connectible with the standards of the scaffold and with each other, and braces, one of which is connected with each of said bars and the other with one of said bars and the sill-bar, substantially as described.

2. The sill-bar, in combination with the outwardly-projecting bar G and an outwardly-projecting brace H, a bar L, connected with said bar G, a brace Q, connected with said bars G L, and blocks D D', connected with said bars G L, the bar G and brace H being connected with the sill-bar and said brace H being connected with said bar G, substantially as described.

JOHN T. O'BRIEN.

Witnesses:
JOHN A. WIEDERSHEIM,
A. P. JENNINGS.